United States Patent [19]

Stolzman

[11] Patent Number: 5,123,667

[45] Date of Patent: Jun. 23, 1992

[54] MATERIAL HANDLING RINGS

[76] Inventor: Michael Stolzman, International Precison Components Corporation, 28468 N. Ballard St., Lake Forest, Ill. 60045

[21] Appl. No.: 580,143

[22] Filed: Sep. 10, 1990

[51] Int. Cl.⁵ .............................................. B62B 3/04
[52] U.S. Cl. .................................. 280/795; 220/94 R; 248/346.1
[58] Field of Search ................... 280/47.34, 47.371, 62, 280/79.11, 79.5; 220/85 H, 85 K, 85 B, 85 R, DIG. 1, 696, 694, 720, 721, 722, 94 R, 96; 248/346.1; 29/447

[56] References Cited

U.S. PATENT DOCUMENTS 4,294,374  10/1981  Ames ........................... 220/DIG. 1

FOREIGN PATENT DOCUMENTS 489618    1/1953   Canada ............................... 280/79.5
2425458  12/1975  Fed. Rep. of Germany ..... 280/79.5

Primary Examiner—Andres Kashnikow
Assistant Examiner—Richard Camby
Attorney, Agent, or Firm—Wood, Phillips, VanSanten, Hoffman & Ertel

[57] ABSTRACT

A drum ring formed as a one-piece molded synthetic resin ring having an outer rim, an inner ledge radially inward therefrom and at least one appendage on the outer rim for placement of a mobility enhancer thereon. The ring can be installed on a typical material handling drum having a cylindrical side wall and bottom and top walls with an annular groove on the side wall adjacent each end wall. The ring is placed on the drum in such a way that the inner ledge of the ring fits inside an annular groove thereby securely attaching the ring to the drum.

13 Claims, 3 Drawing Sheets

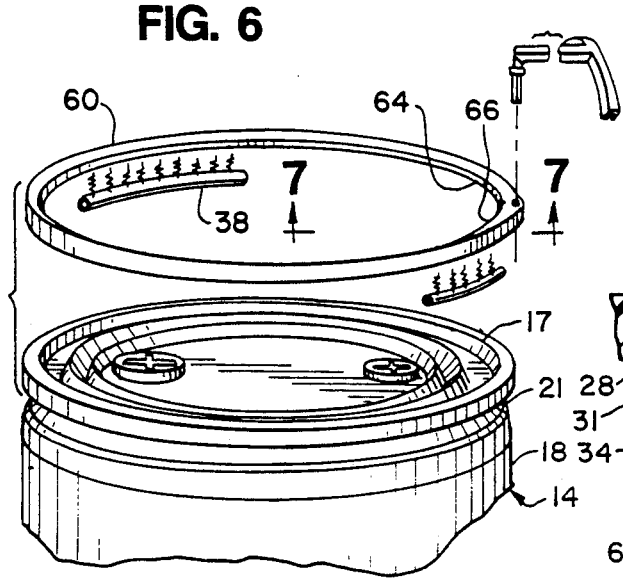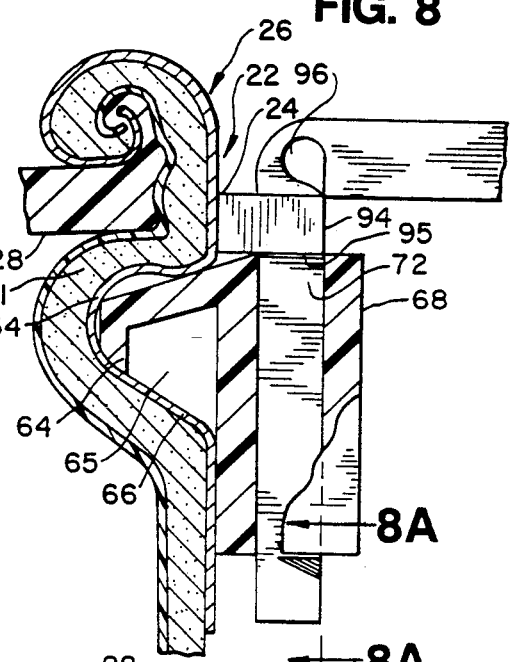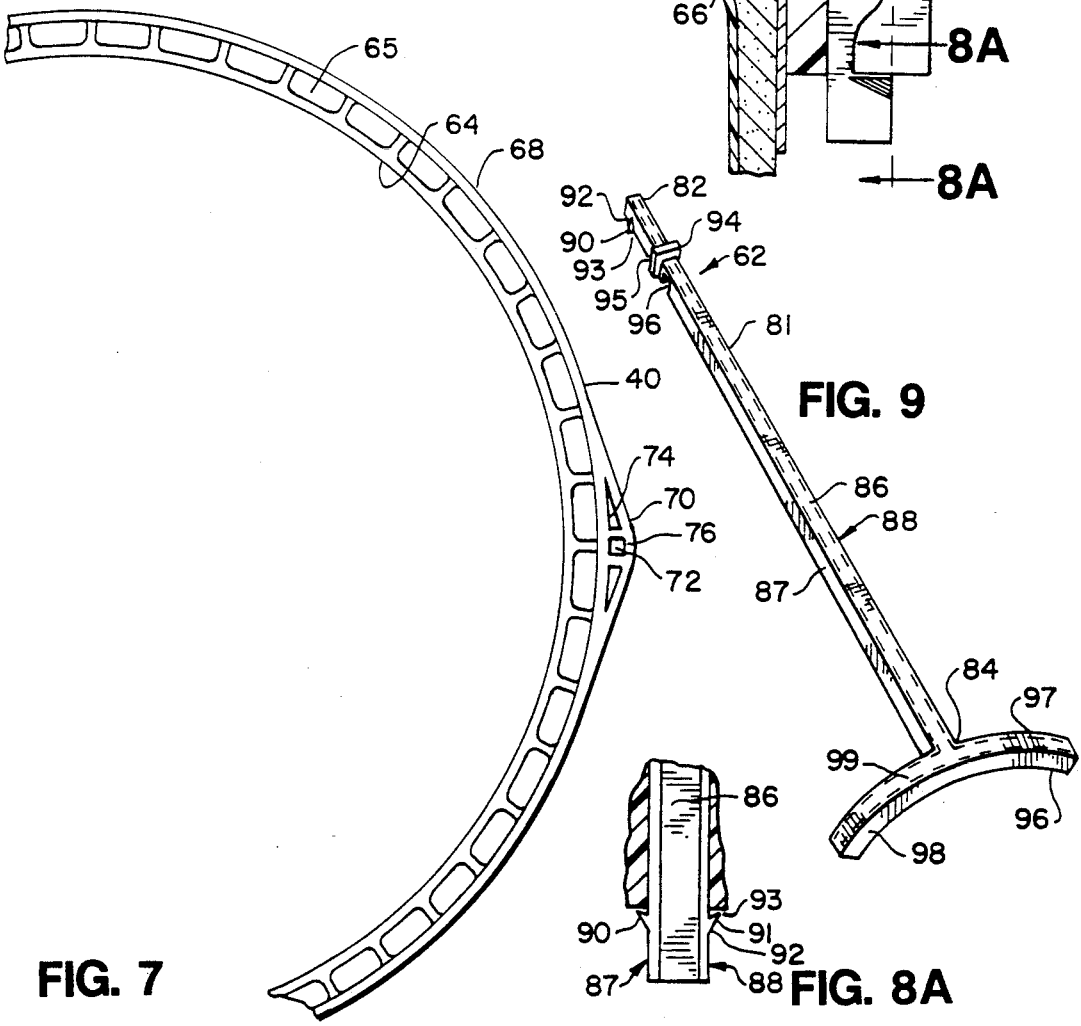

MATERIAL HANDLING RINGS

TECHNICAL FIELD

This invention relates to material handling devices and in particular to material handling rings adapted to be fixedly mounted adjacent one end of a material handling drum for use in enhancing the mobility of the drum by means of casters and a handle.

BACKGROUND ART

In one form of a material handling drum, the drum includes bottom and top walls and a cylindrical side wall. Radially outwardly opening annular grooves are provided in the side wall adjacent the bottom and top walls. The grooves are formed on the side wall of a typical drum as part of the construction. For example, Stoltzman, U.S. Pat. No. 4,813,592, discloses a fiberboard drum having annular grooves near the base and top of the drum as a result of a clamp ring in a turned configuration which provides for improved sealing clamping. The drum rings of the present invention are adapted to be received by such grooves.

There are at least two ways in which a ring can be adapted for use in enhancing mobility. In one form of the invention, the ring is adapted to engage casters for rolling the drum. In another form of the invention, the ring is adapted to engage a handle for pulling the drum.

The ring provides an attachment apparatus that aids in the maneuvering of a material handling drum. A drum containing relatively heavy materials can be difficult to move from one location to another. The drum surface is generally flush and does not provide a means by which to adequately grip the drum. When a drum is too heavy or cumbersome to carry, some way of moving the drum on the ground is desirable.

One method used to move a drum containing relatively heavy materials is to tilt the drum on one side, and then roll the drum along its bottom rim in that tilted position. However, it is difficult to maneuver the drum using this method.

Another way of moving a heavy drum is to place the drum on a flat board or platform that has casters attached beneath. When using a platform, a device is still needed to effect the desired movement of the drum. Such handling of the drum is generally cumbersome since it can be difficult to keep a heavy drum securely atop a caster platform while the platform is in motion.

There has long been a need for a light weight, inexpensive drum ring that can be permanently and securely affixed to a material handling drum and enables attachment of mobility enhancement devices such as casters or handles to facilitate rolling the drum securely on casters while pulling the drum by a handle.

DISCLOSURE OF INVENTION

The present invention comprehends a drum ring adapted for use with a conventional material handling drum which is relatively inexpensive, light weight and yet provides for a long trouble-free life in the handling of the drum.

More specifically, the invention comprehends the provision of a one piece drum ring formed of material that is expandable when heated and has a cylindrical inner ledge which is slightly greater in diameter than the diameter of an annular groove on the drum, to be fixedly received in the annular groove on the drum, an outer rim having slightly greater vertical length than the vertical length of the groove and a diameter slightly greater than that of the drum.

The ring may also include at least one radially outward appendage on the outer rim containing a bore. In one form of the invention there are a plurality of appendages wherein each bore in the appendage receives a caster to be inserted perpendicular to the drum ring so that the drum can be supported on a set of casters. In another form of the invention, there is one appendage having a bore which receives a handle inserted at one end thereof perpendicular to the drum ring.

In order to secure the ring to the drum, the ring is heated to increase its pliability. While in a more pliable state, the ring is stretched around one end and side wall of the drum which have greater diameters then the inner diameter of the inner ledge of the ring at rest. The ring is maneuvered to the groove where in its normal state the inner diameter of the inner ledge is slightly greater than the outer diameter of the groove. When cooled, the ring remains fixed in an unextended position and fits securely in the annular groove.

In the illustrated embodiment, the inner ledge contains circumferentially spaced generally rectangular upwardly opening wells. The wells add to the pliability of the ring while the ring is being stretched over the end and side wall of the drum to reach the annular groove.

In the illustrative embodiment the ring is made of one piece of molded synthetic resin. The ring requires a minimal amount of material as a consequence of having wells in the inner ledge of the ring which reduce the amount of material required for construction of the ring which in turn reduces costs. The wells also simplify the molding process which also lowers the overall production costs.

In one form of the illustrated embodiment, the ring contains three evenly spaced appendages on the outer rim, the appendages being 120 degrees apart. The appendages as illustrated are generally triangular in shape with a concentric generally triangular recess on either side of a partition containing a generally circular downwardly opening bore through which a caster is fitted. In this embodiment, the ring is affixed to an annular groove adjacent the base of the drum.

In another form of the illustrated embodiment, the ring contains one appendage on the outer rim. The appendage as illustrated is generally triangular in shape with a concentric generally rectangular bore which extends the vertical length of the outer rim and through which a handle is fitted.

The present invention contemplates the use of a drum handle for insertion in a bore of an appendage of a drum handle ring. The handle comprises a flexible elongated member having inner and outer ends. The cross sectioned width of the inner end is slightly less than the cross sectional width of the bore so that the inner end may be securely inserted into the bore of the handle ring. Compressible wedge-shaped protuberances beginning at a point adjacent the inner end and sloping outwardly towards the outer end are located at the same position on opposite sides of the member. Further out on the member, a bar is positioned such that the outer end of the protuberance is at a distance from the inner end of the bar that is slightly greater than the vertical length of the bore through the appendage. Still further out on the member, there are notches for pivoting the outer end of the member. At the outer end of the member, a gripper is centrally attached.

The handle is installed by pushing the inner end of the member through the bore thereby compressing the protuberances. The wedge-shape of the protuberances aids in compressing the protuberances as the inner end of the member is pushed through the bore. When the protuberances are pushed past the bore, the protuberances expand and block upward movement through the bore. The bar blocks further downward movement through the bore. The inner end of the member is thus contained within the bore from the outer end of the protuberance to the inner end of the bar.

In one embodiment, the handle for the drum handle ring is made of a one-piece molded synthetic resin and has an elongated member comprising a back panel and two elongated parallel side panels attached longitudinally perpendicular to opposite sides of the back panel. The width of each panel is slightly less than the width of the bore so that the handle member fits securely in the bore. The notches are in the same position in each of the side panels, the compressible protuberances are attached at the same positions on the outer surface of each of the side panels, and the bar is located between and surrounding the panels. The gripper is semicircular in shape and also comprises back and perpendicularly attached side panels.

The drum ring of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein:

FIG. 6 is an exploded view illustrating the arrangement of the drum and the ring as adapted for use with a handle prior to installation, the heat source in the figure is purely for illustrative purposes;

FIG. 7 is a top view of a ring for use with a handle taken along the 7—7 line of FIG. 6;

FIG. 8 is a fragmentary enlarged vertical section illustrating the engagement of the ring with a handle within the annular groove;

FIG. 8A is a fragmentary vertical section illustrating engagement of the handle in the ring taken along the A—A line of FIG. 8; and FIG. 9 is a side elevation view of the handle.

THE BEST MODE FOR CARRYING OUT THE INVENTION

Figure 1:
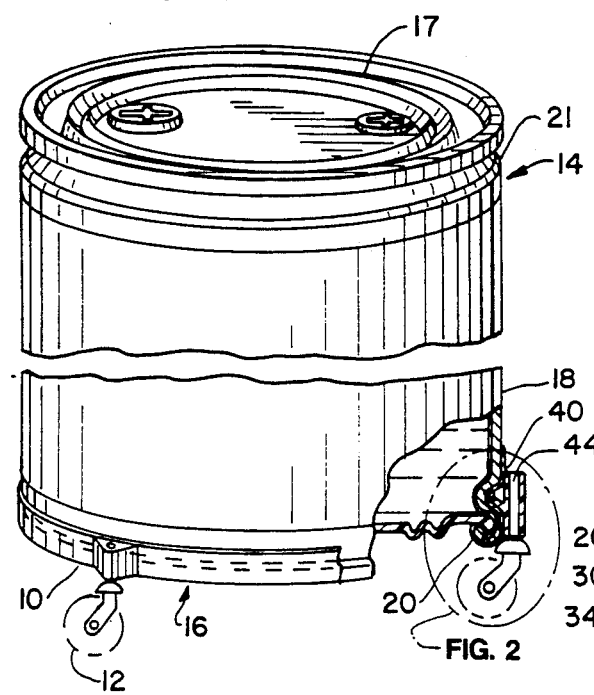
FIG. 1 is a fragmentary side elevation with portions broken away to facilitate illustration of one form of the invention installed on a material handling drum.

In the illustrative embodiment of the invention as disclosed in FIG. 1, a drum ring generally designated 10 is shown to comprise a one piece ring formed of a suitable pliable material such as molded synthetic resin.

The ring 10 is adapted to be mounted to a conventional material handling drum 14 having a bottom wall 16, a top wall 17 and a right circularly cylindrical side wall 18. The side wall 18 is provided with a radially outwardly opening annular groove 20 adjacent the bottom wall 16 and a similar groove 21 adjacent the top wall 17.

The annular grooves 20 and 21 are a standard part of the structure of one type of general material handling drum. The construction of a typical tubular fiberboard material handling drum can be seen in FIG. 2. The seal of the closure 22 on the bottom end of the drum 14 is effected by a clamp ring 24 formed under substantial constrictive pressure forces by suitable means (not shown) to define a sealed connection generally designated 26 between the closure peripheral portion 28 and drum end portions 30. More specifically the cylindrical ring 24 is reformed to define a radially outwardly opening annular groove 20 in a concurrently complementary formed groove 34 in the fiberboard end 30. In the illustrative embodiment as disclosed in FIG. 8, a similar construction as disclosed in FIG. 2 to form the annular groove 20 adjacent the bottom wall 16, is used to form the annular groove 21 adjacent the top wall 17.

The above described drum is merely illustrative of one type of drum on which a ring 10 can be attached. The drawings illustrate two embodiments of the present invention. FIGS. 1-5 illustrate an embodiment wherein the ring is adapted to hold casters. FIGS. 6-9 illustrate a second embodiment wherein the ring is adapted to hold a handle. Other embodiments in addition to those illustrated are also possible as is readily apparent to those skilled in the art.

Figure 2:
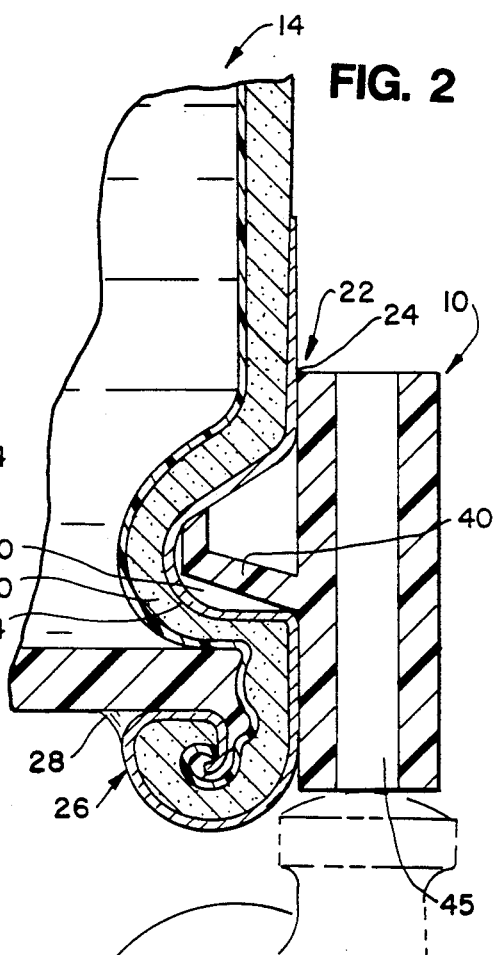
FIG. 2 is a fragmentary enlarged vertical section illustrating the engagement of the ring within the annular groove at the base of the drum.

FIG. 2 illustrates a close-up cut away view of the ring 10 as installed on a drum in one exemplary embodiment wherein the ring 10 fits securely in the groove 20 above the bottom wall 16. The caster ring 10 is adapted to be installed on the bottom end of the drum 14 by relative movement thereof coaxially of the side wall 18 to the installed disposition.

Figure 4:
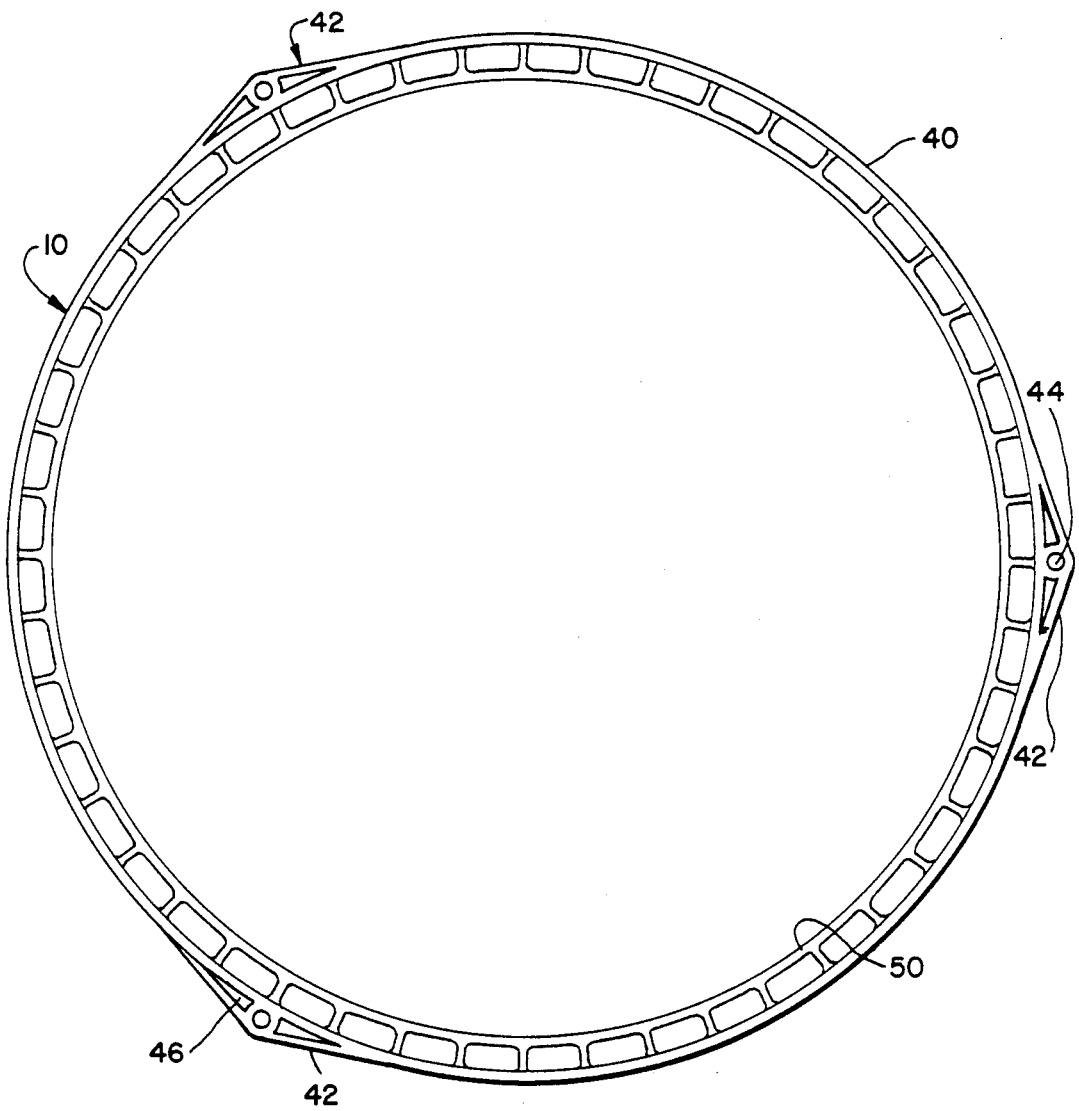
FIG. 4 is a top view of the caster ring.
Figure 5:
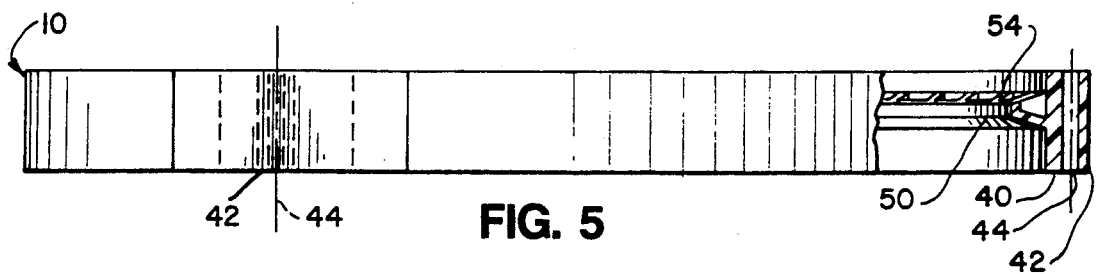
FIG. 5 is a side view of the caster ring with part shown in cross section to facilitate illustration of the construction thereof.

FIGS. 2, 4 and 5 illustrate the construction of one embodiment of the drum ring 10. The ring 10 comprises an outer rim 40. The outer rim 40 has an inner diameter slightly greater than the outer diameter of the drum 14. The height of the outer rim 40 is greater than the height of the groove 20.

The outer rim 40 contains three radially outward appendages 42 which extend the longitudinal length of the outer rim 40 with downwardly opening bores 44 therein for placement of casters 45. The caster 45 has a rod 46 extending upwards which fits securely in the downwardly opening bore 44.

The appendages 42 are 120 degrees apart allowing for a balanced placement of three casters 45 on which the drum 14 is supported.

To conserve material, the appendages 42 are generally triangular in shape with two generally triangular recesses 47 extending the vertical length of the outer rim 40 on either side of a central ridge 48 in which there is the generally circular downwardly opening bore 44 which may extend the vertical length of the appendage 42 for placement of a caster 45. The appendages 42 as illustrated have added strength of lateral support while limiting the amount of material necessary for their construction. Further material is saved by incorporating recesses 47 in the appendages 42 of the outer rim 40.

The ring 10 also contains an inner ledge 50. The horizontal width of the inner ledge 50 corresponds generally to the depth of the annular groove 20. As illustrated in FIG. 2, the general shape of the radially inner ledge 50 gradually narrows radially inwardly to roughly correspond to the shape of the annular groove 20.

As illustrated in FIG. 2, the inner diameter of the ledge 50 is slightly greater than the outer diameter of the groove 20 for a secure fit of the ring 10 on the drum 14.

As best seen in FIG. 5, the inner ledge contains upwardly opening wells 52 on its top wall 54 that are evenly spaced and comprise the majority of the diameter and circumference of the inner ledge 50. The top wall 54 slopes diagonally downwardly. As illustrated in FIG. 2 the wells 52 are upwardly opening when affixed to the bottom groove 20 of the drum 14.

The wells 52 provide a great advantage in the construction of the ring 10. The wells 52 add pliability to the ring when the ring 10 is being stretched for placement on the drum 14, while retaining additional strength for supporting the weight of the drum 14 on the casters 45 by the groove 20. Another great advantage of the numerous wells 52 is that the ring 10 requires less material for production and simplifies the molding process as all walls are of minimal thickness.

The caster ring 10, when associated with the conventional annular groove drum 14 as discussed above, is extremely simple, economical of construction and low in cost while yet providing for secured movement of the drum 14 on casters 45.

Figure 3:
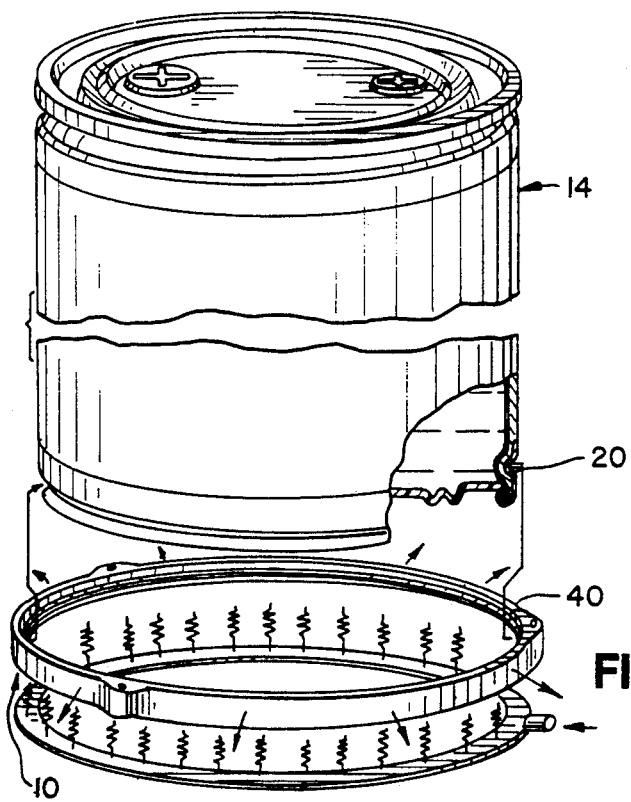
FIG. 3 is an exploded view illustrating the arrangement of the ring and drum prior to installation, the heat source in the figure is purely for illustrative purposes.

FIG. 3 provides an exploded view to better illustrate the placement of the ring 10 on the drum 14. The ring 10 is placed proximate to a radiant heat source 56. The heat makes the ring 10 pliable. The ring 10 is set on a flat surface with the wells 52 facing upwards. The drum 14 is forced downward on the ring 10 forcing the ring 10 to stretch around the bottom wall 16 and side wall 18. The diagonally downwardly sloping top wall of the inner ledge 54 facilitates the stretching movement of the ring 10 around the side wall 18. Once the inner ledge 50 reaches the annular groove 20 it returns to its unstretched state.

In FIG. 2, the caster ring 10 in its non-stretched state fits securely inside the annular groove 20. After the caster ring cools and the material is no longer flexible, the caster ring 10 remains in place and can not be loosened from the drum 14. The casters 12 can then be installed. The drum 14 is thus securely supported by the ring 10 and the casters 12.

An alternate embodiment is illustrated in FIGS. 6-9. With reference to FIG. 6, a drum handle ring 60 is adapted for attachment of a handle 62. The ring 60 is adapted to be installed at the top annular groove 21 by relative movement of the ring 60 to the drum 14 coaxially of the side wall 18, to the installed disposition.

Similar to the caster ring 10, the handle ring 60 contains an inner ledge 64. The horizontal width of the inner ledge 64 corresponds generally to the depth of the annular groove 21. The general shape of the radially inner ledge 64 gradually narrows radially inwardly to roughly correspond to the shape of the annular groove 21.

Referring to FIG. 8, the inner diameter of the ledge 64 is slightly greater than the outer diameter of the groove 21 for a secure fit of the ring 60 on the drum 14.

The inner ledge 64 contains downwardly opening wells 65 on its bottom wall 66 that are evenly spaced and comprise the majority of the diameter and circumference of the inner ledge 64. The bottom wall 66 slopes diagonally upwardly.

The ring 60 further comprises an outer rim 68 which has an inner diameter slightly greater than the outer diameter of the drum 14. The height of the outer rim 68 is greater than the height of the groove 21. In the embodiment illustrated in FIGS. 6 through 8, the outer rim 68 contains one radially outward appendage 70 which extends the longitudinal length of the outer rim 68 with a generally square shaped bore 72 therein for placement of the handle 62.

To conserve material, the appendage 70 is generally triangular in shape with two generally triangular recesses 74 extending the vertical length of the outer rim on either side of a central ridge 76 in which the bore 72 extends the vertical length of the appendage 70 for placement of the handle 62.

The handle 62, when associated with the conventional annular groove drum 14, is extremely simple, economical of construction and low in cost while yet providing for secured movement of the drum 14.

Referring to FIG. 9, the handle 62 is made of a suitable material such as a one-piece molded synthetic resin. The handle 62 is comprised of a flexible elongated member 81 having an inner and outer end 82 and 84, respectively. As seen in FIG. 8A, the elongated member 81 is u-shaped in cross section and includes a back panel 86 and two generally parallel side panels 87 and 88 attached perpendicularly thereto.

The widths of the handle panels 86, 87 and 88 are slightly less than the width of the bore 72, for secure placement of the handle 62 within the bore 72.

Compressible protuberances or wings 90 and 91 are located at the same location on the outside of each side panel 87 and 88, adjacent the inner end 82. Each wing 90 has inner and outer ends 92 and 93 and slopes gradually diagonally outward as the wing extends longitudinally from the inner end 92 toward the outer end 93.

Spaced outwardly from the outer end 93 of each wing 90 and 91, a distance slightly greater than that of the longitudinal length of the bore 72 in the appendage 70, is a bar 94 which surrounds the outside of the member 81. The handle 62 is contained within the bore 72 between the outer ends 93 of wings 90 and 91 and the inner end 95 of the bar 94.

Further out toward the outer end 84 from the bar 94 are notches 96 in the same location in both of the side panels 87 and 88 for providing a location where the handle 62 can be pivoted or bent for increased control and maneuverability as illustrated in FIG. 8.

A gripper 96 is centrally attached to the outer end 84 of the elongated member 81. The gripper 96 is comprised of front and top panels 97, 98 and 99 wherein the generally parallel back and front panels 97 and 98 are generally perpendicular to the top panel 99. The back panel 97 of the gripper 96 is attached to the tip of the elongated member 81. The gripper 96 is generally semi-circular in shape for easier handling.

FIG. 6 provides an exploded view to better illustrate the placement of the ring 60 on the drum 14. The ring 60 is placed proximate to a radiant heat source 56. The heat makes the ring 60 pliable. The ring 60 is set on a flat surface with the wells 65 facing upwards. The drum 14 is inverted and forced downward on the ring 60, forcing the ring 60 to stretch around the top wall 17 and side wall 18. The diagonally downwardly sloping bottom wall of the inner ledge 66 facilitates the stretching movement of the ring 60 around the side wall 18. Once the inner ledge 64 reaches the annular groove 21 it returns to its unstretched state.

In FIG. 7, the handle ring 60 in its non-stretched state fits securely inside the annular groove 21. After the handle ring 60 cools and the material is no longer flexible, the handle ring 60 remains in place and can not be loosened from the drum 14. The handle 62 can then be installed.

As illustrated in FIG. 6, the inner end 82 of handle 62 is pushed through the appendage. The wings 90 and 91 are flattened as the inner end 82 of the elongated member 81 is pushed downward through the bore 72 in the appendage 70. The gradual outward slope of the wings from the inner end towards the outer end, aids in the compression of the wings as the inner end of the member is pushed through the bore. Referring to FIG. 8A, once inserted, the wings 90, 91 expand to non-compressed state and the handle is contained by the generally perpendicular outer surfaces 93 of the wings 90, 91 from upward movement of the handle. The member 81 is pushed downward through the bore 72 up to the bar 94 which prevents further downward movement of the member 81 through the bore 72.

During insertion, the handle 80 is oriented with the notches 96 faced away from the drum 14, so that the outer end 84 of the handle 80 can be bent away from the drum 14 and towards the user pulling the drum 14.

A drum 14 may have installed thereon either or both embodiments of the drum ring in separate grooves 20 and 21 of the drum 14. In general, a drum ring, such as the illustrated embodiments 10 and 60, is fixedly received in an annular groove 20, 21 of the drum 14 by means of the inner ledge 50, 64 of generally cylindrical shape having a slightly greater inner diameter than the outer diameter of the annular groove 20, 21 of the drum 14. The inner ledge 50, 64 contains evenly spaced wells 52, 65. The outer rim 40, 68 surrounds the inner ledge 50, 64 and has a slightly greater inner diameter than the outer diameter of the drum 14. The outer rim 40, 68 also contains a means for securely attaching a mobility enhancer such as a caster 45 or a handle 62.

As is clear, one great advantage of this invention is that the rings are an economical, light weight addition to the drum which can be permanently installed on the drum for secure movement of the drum by casters and a handle.

The foregoing disclosure and specific embodiments are illustrative of the broad inventive concepts comprehended by the invention, and is in no way meant to be limiting.

I claim:

1. A drum ring for enhancing the mobility of a drum having bottom and top walls and a cylindrical side wall provided with at least one annular outwardly opening groove, said drum ring comprising:
   an outer rim of generally cylindrical shape having an inner diameter slightly greater than the outer diameter of the drum;
   an inner ledge of generally cylindrical shape projecting radially inwardly from said outer rim having a shorter vertical length than said outer rim and having a slightly greater inner diameter than the outer diameter of the annular groove on the drum to which the drum ring is to be mounted, to be fixedly received in the annular groove of the drum, said inner ledge containing adjacent circumferentially spaced wells; and
   means for securely attaching a mobility enhancer to said outer rim.

2. The ring as in claim 1 wherein the thickness of each said well is greater than the thickness of a partition separating said wells.

3. The ring as in claim 2 wherein said wells are generally rectangular in cross section.

4. A drum ring for enhancing the mobility of a drum having bottom and top walls and a cylindrical side wall provided with at least one annular outwardly opening groove, said drum ring comprising:
   an outer rim of generally cylindrical shape having an inner diameter slightly greater than the outer diameter of the drum;
   an inner ledge of generally cylindrical shape projecting radially inwardly from said outer rim having a shorter vertical length than said outer rim and having a slightly greater inner diameter than the outer diameter of the annular groove on the drum to which the drum ring is to be mounted, to be fixedly received in the annular groove of the drum; and
   means for securely attaching a mobility enhancer to said outer rim, said means for securely attaching mobility enhancers comprising at least one radially outward appendage on said outer rim, said appendage containing a bore for receiving a mobility enhancer.

5. The ring as in claim 4 wherein said inner ledge, outer rim, and appendage are made of a single piece of molded synthetic resin.

6. The ring as in claim 4 wherein said ring is placed adjacent said base of said drum and comprises a plurality of appendages, each appendage containing a downwardly opening bore for receiving a caster in each appendage to be inserted perpendicular to the ring so that the drum is supported by said casters.

7. A drum caster ring for use in providing a drum with mobility by means of casters inserted longitudinally through the ring, the drum having a bottom wall and a side wall provided with an annular, outwardly opening groove spaced above the bottom wall, said caster ring comprising:
   an outer rim of generally cylindrical shape having an inner diameter slightly greater than the outer diameter of the drum;
   an inner ledge of generally cylindrical shape projecting radially inwardly from said outer rim having a shorter vertical length than said outer rim and having slightly greater inner diameter then the outer diameter of the annular groove on the drum to which the caster ring is to be mounted, to be fixedly received in the annular groove of the drum; and
   a means or securely attaching casters to said outer rim.

8. The caster ring as in claim 7 wherein said means for securely attaching casters comprises a plurality of radially outward appendages on said outer rim, each of said appendages containing a downwardly opening bore for receiving a caster to be inserted perpendicular to the caster ring.

9. The caster ring as in claim 8 wherein said appendage is generally triangular in shape and contains two concentric triangular recesses on each side of a divider section containing said bore for receiving a caster.

10. The caster ring as in claim 9 wherein said triangular recesses extend from the top of said appendage to the bottom of said appendage.

11. The caster ring as in claim 8 wherein said opening for receiving a caster is generally circular in shape.

12. The caster ring as in claim 8 wherein there are three appendage 120 degrees apart.

13. The caster ring as in claim 8 wherein said downwardly opening bores extend longitudinally through the appendage.

* * * * *